United States Patent
MacKenzie

[15] 3,650,855
[45] Mar. 21, 1972

[54] SOLID ROCKET FUEL COMPOSITION CONTAINING METAL HYDRIDE WITH BUTYL RUBBER AND METHOD OF MAKING SAME

[72] Inventor: Gerald L. MacKenzie, Redlands, Calif.

[73] Assignee: Donald G. De Long, Redlands, Calif. a part interest

[22] Filed: Dec. 19, 1962

[21] Appl. No.: 245,676

[52] U.S. Cl. ................................. 149/19, 149/44, 149/87, 149/109, 264/3
[51] Int. Cl. ....................................................... C06d 5/00
[58] Field of Search .................. 149/19, 44, 87, 109; 60/35.4; 264/3

[56] References Cited

UNITED STATES PATENTS

| 3,053,709 | 9/1962 | Herty | 149/19 |
| 3,017,748 | 1/1962 | Burnside | 149/19 X |

*Primary Examiner*—Benjamin R. Padgett
*Attorney*—Herbert E. Kidder

EXEMPLARY CLAIM

1. A solid fuel composition suitable for use with a liquid oxidizer in a hybrid rocket motor, which comprises a solidly compacted and heat-cured grain having good dimensional stability and strength adequate to resist the stresses of rocket motor combustion, said grain consisting of about 90 percent by weight of lithium hydride and about 10 percent by weight of butyl rubber.

3 Claims, No Drawings

SOLID ROCKET FUEL COMPOSITION CONTAINING METAL HYDRIDE WITH BUTYL RUBBER AND METHOD OF MAKING SAME

The present invention relates to a new composition for use as a solid fuel for "hybrid" rocket motors, and to a method of making the same. More specifically, the invention relates to a novel composition containing up to 90–95 percent by weight of hydride of lithium, lithium-aluminum alloy, or other low molecular weight metal such as sodium, potassium, aluminum, magnesium, and alloys thereof, in an elastomer binder such as butyl rubber.

Hydrides of the metals mentioned above have, ever since they were first made available, held out many attractive features as high energy fuel for hybrid rocket motors because of their high specific impulse when used with suitable highly active liquid oxidizers such as chlorine trifluoride, nitrogen tetroxide, or perchloral fluoride. Lithium hydride and lithium aluminum hydride, in particular, are among the most promising of the fuel materials being considered at this time because of their extremely high specific impulse. Another advantage of these hydrides as rocket motor fuels is that they are hypergolic when combined with certain liquid oxidizers, namely chlorine trifluoride and perchloral fluoride, thereby giving the rocket motor on-off capability, which is highly desirable for control purposes.

However, lithium hydride and lithium aluminum hydride are extremely reactive with all elastomeric polymers containing functional groups such as hydroxyl, ketone, ester, or acid, and are also reactive with any moisture contained in otherwise-compatible polymers, such as butyl rubber. Heretofore, the only binders with which lithium hydride has been successfully used are polyurethanes, or polyethers, to form a castable composition. The chief disadvantage of this system is the low loading (of the order of 60 percent by weight) of lithium hydride that is obtainable. With the present invention, loadings of 90 percent or more of lithium hydride or lithium aluminum hydride are obtainable, with a corresponding increase in the specific impulse of the propellant.

In the preparation of the new compound of my invention, solid butyl rubber containing some unsaturation capable of cross-linking with sulfur is cut up into small pieces and dissolved in a hydrocarbon solvent consisting of dried hexane, cyclohexane, or petroleum ether, in any proportions up to 35 percent by weight of butyl and 65 percent of solvent. While all of the solvents named will work satisfactorily, hexane is the preferred one, because of its relatively low boiling point. A small quantity of powdered lithium hydride, of the order of 10 grams per 1 pound batch of rubber, is then added to the butyl-solvent mixture, and is allowed to react with any residual moisture, while the surface of the mixture is purged with nitrogen. Evaporation of the highly volatile solvent tends to keeps the mixture cool by absorbing the heat of reaction between the lithium hydride and water.

Upon completion of the reaction of the lithium hydride with the residual moisture, the balance of the powdered lithium hydride is added, to bring the relative proportions up to 90 to 95 percent by weight of lithium hydride and 5 to 10 percent by weight of butyl rubber. The ingredients are thoroughly mixed, and then the curatives for the butyl rubber are added. Such curatives may consist of a combination of red lead, zinc oxide, sulfur, and dibenzoparaquinone dioxime, the percentages of which will vary depending upon the mol percent unsaturation in the butyl rubber.

Mixing is now continued under vacuum to remove the solvent, until the solvent is substantially completely removed. When the solvent concentration has been reduced to not more than 0.1 percent by weight, the mass forms a soft, friable crumb, at which point the mix is considered complete. The crumb is loaded into a die of suitable configuration, and is pressed to the desired density. The molded part, enclosed within the die or its die sleeve, is then placed in a curing oven for cure at an appropriate time and temperature. The molded grain is now ready to be bonded into a rocket motor casing, and has considerable strength to hold its shape and withstand the stresses to which it is exposed in the rocket motor during the combustion period. Tensile strength of the order of 200 p.s.i. is obtainable in the finished grain, along with elongation up to 10 percent, depending upon the density, degree of cure, percentage of loading, etc.

Another elastomeric polymer that can be used as a binder for the lithium hydride or lithium aluminum hydride is polyisobutylene rubber, which differs from butyl rubber in the one respect that it contains no unsaturation capable of cross-linking with sulfur. Consequently, the method of making a composition consisting of lithium hydride or lithium aluminum hydride and polyisobutylene rubber, would omit the steps of adding the curatives after the hydride powder has been mixed into the rubber solution, and curing the pressed grain in a curing oven. Instead, the crumb would be pressed in the die to the desired density, which would complete the process. A grain made in this manner has the same high specific impulse as the previously described grain, but the physical properties are somewhat less.

It is essential to the invention that the rubber binder, solvent, and other ingredients should be as nearly completely free of moisture as possible, as even the smallest traces of moisture will react with the lithium hydride, causing the evolution of hydrogen gas and heat. The important step that makes possible the incorporation of a large percentage of lithium hydride or lithium aluminum hydride in an elastomer binder is the step of converting solid butyl rubber or solid polyisobutylene rubber into the liquid state by dissolving the same in dried hexane, cyclohexane, or petroleum ether, which makes possible the intimate mixture of the hydride with the binder, and then removing the solvent and subsequently molding the resulting crumb under pressure with or without heat as the case may be, depending on whether the rubber binder is curable or not.

The solid grain composition of the present invention is combined in the rocket motor combustion chamber with liquid oxidizer, such as nitrogen tetroxide, chlorine trifluoride, or perchloral fluoride, all of which are highly reactive oxidizers; the latter two having the property of reacting hypergolically with the fuel. Other liquid oxidizers of the same characteristics are known in the art, and may be used in place of the three named above.

While the composition and method of the present invention have been described primarily in terms of lithium hydride or lithium aluminum hydride, it will be understood by those skilled in the art that hydrides of other metals in the group consisting of sodium, potassium, aluminum, magnesium, and alloys thereof may be used to good advantage, although the resulting composition will have a somewhat lower specific impulse.

I claim:

1. A solid fuel composition suitable for use with a liquid oxidizer in a hybrid rocket motor, which comprises a solidly compacted and heat-cured grain having good dimensional stability and strength adequate to resist the stresses of rocket motor combustion, said grain consisting of about 90 percent by weight of lithium hydride and about 10 percent by weight of butyl rubber.

2. The method of preparing a solid fuel grain consisting essentially of 90 to 95 percent by weight of hydride of metal selected from the group consisting of lithium, sodium, potassium, aluminum, magnesium, and alloys thereof, and from 5 to 10 percent of synthetic rubber selected from the group consisting of butyl rubber and polyisobutylene rubber, which comprises:

dissolving the solid synthetic rubber in moisture-free hydrocarbon solvent selected from the group consisting of hexane, cyclohexane and petroleum ether, in any proportions up to 35 percent by weight of rubber and 65 percent of solvent;

introducing a small quantity of hydride into the rubber/solvent solution and allowing the same to react with any residual moisture while purging the surface with nitrogen;

adding the remainder of the hydride to the rubber/solvent solution and thoroughly mixing the ingredients under vacuum to evaporate the solvent therefrom;
loading the resultant crumb into a die; and
pressing the crumb into a solidly compacted, coherent grain.

3. The method of preparing a solid fuel grain consisting essentially of about 90 percent by weight of lithium hydride and about 10 percent of cured butyl rubber, which comprises:
dissolving solid butyl rubber containing some unsaturation capable of cross-linking with sulfur in dried hexane;
introducing a small quantity, of the order of 10 grams per pound of rubber, of lithium hydride into the butyl rubber/hexane solution and allowing the same to react to completion with any residual moisture while purging the surface with nitrogen;
adding the remainder of the lithium hydride to the solution;
adding curatives including sulfur for cross-linking with the unsaturation of the butyl rubber;
thoroughly mixing the ingredients under vacuum so as to remove substantially all of the hexane by evaporation;
loading the resulting crumb into a die and pressing the same into a solidly compacted, coherent grain; and
curing the said grain at an elevated temperature.

* * * * *